US Patent Number: 4,983,555
Date of Patent: Jan. 8, 1991

Roy et al.

[54] APPLICATION OF TRANSPARENT POLYCRYSTALLINE BODY WITH HIGH ULTRAVIOLET TRANSMITTANCE

[75] Inventors: Donald W. Roy, Golden; James L. Hastert, Lakewood, both of Colo.

[73] Assignee: Coors Porcelain Company, Golden, Colo.

[21] Appl. No.: 185,189

[22] Filed: Apr. 22, 1988

Related U.S. Application Data

[63] Continuation-in-part of Ser. No. 47,403, May 5, 1987, abandoned.

[51] Int. Cl.$^5$ ............................................. C04B 35/02
[52] U.S. Cl. ................................... 501/120; 501/153; 264/65; 264/1.2
[58] Field of Search ................... 264/65, 570, 1.2; 501/120, 153

[56] References Cited

U.S. PATENT DOCUMENTS

| | | |
|---|---|---|
| 3,026,210 | 3/1962 | Coble . |
| 3,186,906 | 6/1974 | Falckenberg . |
| 3,239,322 | 3/1966 | Carter . |
| 3,294,878 | 12/1966 | Carnall, Jr. et al. . |
| 3,392,056 | 7/1968 | Maskalick . |
| 3,431,326 | 3/1969 | Letter . |
| 3,530,209 | 9/1970 | Ho . |
| 3,531,089 | 9/1970 | Bagley . |
| 3,556,843 | 1/9171 | Buck .................................. 117/227 |
| 3,589,880 | 6/1971 | Clark . |
| 3,676,211 | 7/1972 | Kourtesis . |
| 3,768,990 | 10/1973 | Sellers et al. . |
| 3,853,973 | 12/1974 | Hardtl et al. . |
| 3,875,277 | 4/1975 | Bratton et al. . |
| 3,950,504 | 4/1976 | Belding et al. . |
| 3,974,249 | 8/1976 | Roy et al. . |
| 4,009,042 | 2/1977 | Rittler . |
| 4,047,960 | 9/1977 | Reade . |
| 4,049,582 | 9/1977 | Erickson et al. . |
| 4,056,457 | 11/1977 | Vossen, Jr. . |
| 4,066,481 | 1/1978 | Manasevit et al. . |
| 4,078,711 | 3/1978 | Bell et al. . |
| 4,146,379 | 3/1979 | Copley et al. . |
| 4,147,584 | 4/1979 | Garrison et al. . |
| 4,171,400 | 10/1979 | Rosette et al. . |
| 4,191,577 | 3/1980 | Buescher et al. . |
| 4,263,374 | 4/1981 | Glass et al. . |
| 4,269,651 | 5/1981 | Glass et al. . |
| 4,273,587 | 6/1981 | Oda et al. . |
| 4,296,065 | 10/1981 | Ishii et al. .......................... 264/325 |
| 4,304,461 | 12/1981 | Stewart et al. . |
| 4,316,936 | 2/1982 | Hing . |

(List continued on next page.)

OTHER PUBLICATIONS

R. Lopez, "How the Hardware is Progressing," International Defense Review vol. 1, pp. 84-85 (1986).
"Stinger," Air Defense Artillery Magazine, Issue 1, p. 33 (1985).

(List continued on next page.)

Primary Examiner—Olik Chaudhuri
Assistant Examiner—Andrew Griffis
Attorney, Agent, or Firm—Sheridan, Ross & McIntosh

[57] ABSTRACT

A transparent polycrystalline body having high ultraviolet transmissivity is provided. The body is preferably a sintered magnesia-alumina spinel body having a transmittance of at least 85 percent in the wavelength range from 0.4 microns to 0.8 microns and a transmittance at some wavelength in the wave length range between about 0.2 and about 0.4 microns of at least about 86 percent and a porosity of less than about 0.001 percent. The sintered body is produced by a two-step method comprising forming a closed porosity body from a spinel powder and subjecting the closed porosity body to a hot isostatic pressure treatment. The resulting body has high transmissivity of electromagnetic radiation in the range between about 0.2 microns and about 6 microns, is resistant to abrasion or erosion, does not substantially deteriorate after exposure to ultraviolet light, and has high strength. A number of applications of the magnesia-alumina spinel body are disclosed for which the material is advantageous.

58 Claims, 11 Drawing Sheets

U.S. PATENT DOCUMENTS

| | | |
|---|---|---|
| 4,347,210 | 8/1982 | Maguire et al. ............. 264/294 |
| 4,401,767 | 7/1983 | Dietz et al. . |
| 4,412,963 | 11/1983 | Hing . |
| 4,436,785 | 3/1984 | Dietz et al. . |
| 4,459,166 | 7/1984 | Dietz et al. . |
| 4,461,750 | 7/1984 | Chess et al. . |
| 4,471,026 | 9/1984 | Nicolas et al. . |
| 4,488,673 | 12/1984 | Hopper, Jr. . |
| 4,520,116 | 5/1985 | Gentilman et al. . |
| 4,524,138 | 6/1985 | Schwetz et al. . |
| 4,535,029 | 8/1985 | Intrater et al. . |
| 4,543,346 | 9/1985 | Matsui . |
| 4,584,151 | 4/1986 | Matsui et al. . |
| 4,585,972 | 4/1986 | Hing . |
| 4,587,225 | 5/1986 | Tsukuma ........................ 501/120 |
| 4,600,658 | 7/1986 | Anderson et al. . |
| 4,604,299 | 8/1986 | De Luca et al. . |
| 4,666,251 | 5/1987 | Liberman . |
| 4,701,352 | 10/1987 | De Luca et al. . |

OTHER PUBLICATIONS

P. C. Archibald, et al. "Scattering From Infrared Missile Domes," SPIE, vol. 133 pp. 71-75 (1978).

G. W. Ewing, Instrumental Methods of Chemical Analysis, 3d ed. p. 8, McGraw-Hill Book Co.

"Ultraviolet Radiation" Van Nostrands' Scientific Encyclopedia, 4th ed. pp. 1908-1909.

M. W. Benecke, et al. "Effect of LiF on Hot-Pressing of MgO," Journal of the American Ceramic Society, vol. 50, No. 7, pp. 365-368.

James R. Floyd, "Effect of Composition and Crystal Size of Alumina Ceramics on Metal-to-Ceramic Bond Strength," Ceramic Bulletin, vol. 42, No. 2, pp. 65-76.

"Joining of Ceramic-Metal Systems: General Survey,'-'Encyclopedia of Material Science and Engineering, Michael B. Bever, ed., pp. 2463-2475 at 2470.

R. Gentilman, et al., Raytheon Company, Research Division, Waltham, MA 02154, "High Durability Missile Domes," Interim Technical Report for Period One, Oct. 1977 Through 30 Sep. 1978.

"ASRAAM Development," International Defense Review, vol. 7, pp. 1171-1172(1985).

M. D. Herr, et al., "Evaluation of a Statistical Fracture Criteria for Magnesium Fluoride Seeker Domes," Naval Weapons Center, N.W.C. Technical Publication 6226 (1980).

"Infrared Transmitting Glasses," Product Information No. 3112/1e, Schott Glass Technologies, Inc. May 1982.

Roy, et al., "Polycrystalline $MgAl_2O_4$ Spinel for Use as Windows and Domes from 0.3 to 0.6 Microns."

Gentilman, "Fusion-Casting of Transparent Spinel," American Ceramic Society Bulletin, vol. 60, p. 906 (1981).

Lacour, "Relationship Between Thermal Chemical Treatment and Transparency of $MgAl_2O_4$ Prepared from Freeze-Dried Liquid Solutions," Science Sintering, vol. 12 No. 1, pp. 39-48.

Strobel, "Thermostructural Evaluation of Spinel Infrared (IR) Domes," SPIE vol. 297 Emerging Optical Materials, pp. 125-136 (1981).

C. A. Calow, et al., "The Solid State Bonding of Nickel to Alumina," Journal of Material Science, vol. 6, pp. 156-163 at 159 (1971).

"Technology Update," Ceramic Bulletin, vol. 67, No. 1, p. 64 (1988).

J. E. McDonald, et al., "Adhesion in Aluminum Oxide-Metal Systems," Transactions of the Metallurgical Society of AIME, vol. 233, pp. 512-517 (1965).

Encyclopedia for Material Science and Engineering, vol. 1, Bever ed., pp. 584-87, 595-611.

Kohno, et al. "Metallization of Non-Oxide Ceramics," British Ceramic Proceedings vol. 37, pp. 125-130 (1968).

Morozumi, et al. "Bonding Mechanism Between Alumina and Niobium," Journal of Materials Science, vol. 16, pp. 2137-2144 (1981).

Plamour III, "Development of Polycrystalline Spinel for Transparent Armour Application," Final Report Contract DAAG 46-69-C-0097.

M. Hirota, "X-Ray Studies on the Reaction Product Formed in the Metallized Layer-Ceramic Interface of Metal-to-Ceramic Seal," Transactions—Japanese Institute of Metals, vol. 9, pp. 266-272 (1986).

"Metallizing for Ceramics," Ceramic Industry—Japan, p. 7 (Jan. 1988).

"Metallizing," Advanced Ceramics Report, p. 2 (1986).

W. J. Tomlinson, "Low Temperature Metallization of (List continued on next page.)

OTHER PUBLICATIONS

Debased Alumina," *Surface and Coatings Technology*, vol. 27, pp. 23–28 (1986.

Musikant, "Development of a New Family of Improved Infrared (IR) Dome Ceramics," SPIE, vol. 297 Emerging Optical Materials (1981) pp. 1–12.

Rice, et al., "Ambient Strength and Fracture Behavior of $MgAl_2O_4$," Proceedings of 1971 International Conference on Mechanical Behavior of Materials, vol. 4 pp. 422–431.

Roy, "Developement of Hot Pressed Spinel for Multispectral Windows and Domes," Technical Report AEWAL-TR-81-4005.

Gatti, "Developement of a Process for Producing Transparent Spinel Bodies," Final Report Contract in 00019-69-C-0133 (9-69).

Gatti, "Development of a Process for Producing Transparent Spinel Bodies," Final Report Contract N00019-71-C-1026.

M. E. Thomas, et al., "Infrared Transmission Properties of Sapphire, Spinel, and Yttria as a Function of Temperature," SPIE vol. 683, pp. 41–48 (1986).

J. A. Cox et al. "Comparative Study of Advanced IR Transmissive Materials," SPIE, vol. 683 (1986).

R. L. Gentilman, "Current and Emerging Materials for 3–5 Micron IR Transmission," SPIE, vol. 683, pp. 2–11 (1986).

P. C. Archibald, et al., "Optical Measurement on Advanced Performance Domes," SPIE, vol. 505 (1984).

"Techbits," vol. 66-2, pp. 11–14, Kodak Periodical, p-3, pp. 11–12 (1966).

"Transparent $MgAl_2O_4$ Spinel, a Broad Band Window Material for Fuzes and Guidance Systems," Roy, et al.

R. J. Bratton & S. M. Ho. "$MgAl_2O_4$ Fibers and Platelets," *Journal of the American Ceramic Society*, vol. 51, No. 1, pp. 56–57 (1968).

R. J. Bratton, "Coprecipitates Yielding $MgAl_2O_4$ Spinel Powders," *Ceramic Bulletin*, vol. 48, No. 8, pp. 759–762 (1969).

R. J. Bratton, "Characterization and Sintering of Reactive $MgAl_2O_4$ Spinel," Ceramic Bulletin, vol. 48, No. 11, pp. 1069–1075(1969).

R. J. Bratton, et al., "Densification Phenomena in the Hot-Pressing of Spinel," *Journal of Materials Science*, vol. 7, pp. 1363–1368 (1972).

R. J. Bratton, "Translucent Sintered $MgAl_2O_4$," *Journal of the American Ceramic Society*, vol. 57, No. 7, pp. 2983-286 (1974).

"A Reconsideration of Stress and Other Factors in the Kinetics of Densification," *Kinetics of Reactions in Ionic Systems*, pp. 392–407 (1969), H. Palmour III, et al.

4,983,555

APPLICATION OF TRANSPARENT POLYCRYSTALLINE BODY WITH HIGH ULTRAVIOLET TRANSMITTANCE

REFERENCE TO CO-PENDING APPLICATION

This application is a continuation-in-part application of the commonly assigned U.S. patent application Ser. No. 047,403 filed May 5, 1987 now abandoned.

FIELD OF THE INVENTION

The present invention relates to applications of a transparent polycrystalline body with high transmittance and, particularly, a polycrystalline body of sintered spinel with high transmittance in the ultraviolet wave lengths.

BACKGROUND INFORMATION

In a number of applications, there is need for a strong, tough, transparent window material having a high transmissivity throughout a wide range of electromagnetic radiation. Such a window material is useful, for example, for covering a port used in connection with instrumentation for detecting electro-magnetic radiation. Materials which have been used for producing a transparent body include metal fluorides, particularly magnesium fluoride (U.S. Pat. No. 3,589,880 issued June 29, 1971 to Clark; U.S. Pat. No. 3,294,878 issued Dec. 27, 1966 to Carnall, Jr., et al.; U.S. Pat. No. 3,431,326 issued Mar. 4, 1969 to Letter), aluminum oxynitride (U.S. Pat. No. 4,520,116 issued May 28, 1985 to Gentilman, et al.), aluminum niobate or tantalate (U.S. Pat. No. 4,047,960 issued Sept. 13, 1977 to Reade), and solid solutions of alumina, silica and other oxides (U.S. Pat. No. 4,009,042 issued Feb. 22, 1977 to Wittler) and alumina, with minor amounts of spinel (U.S. Pat. No. 3,026,210 issued Mar. 20, 1962 to Coble).

Previous methods of ceramic preparation which have included a hot-press or closed-porosity step followed by a hot isostatic press step have included U.S. Pat. No. 4,461,750 issued July 24, 1984 to Chess, et al., U.S. Pat. No. 4,524,138 issued June 18, 1985 to Schwetz, et al., and U.S. Pat. No. 3,853,973 issued Dec. 10, 1974 to Hardtl, et al.

Methods have also been developed for production of transparent bodies substantially from a magnesia-alumina spinel. U.S. Pat. No. 3,974,249 issued Aug. 10, 1976 to Roy, et al., U.S. Pat. No. 3,768,990 issued Oct. 30, 1973 to Sellers, et al., U.S. Pat. No. 3,531,308 issued Sept. 29, 1970 to Bagley. Polycrystalline bodies of spinel are, in general, more easily formed than single-crystal or fusion-cast spinel or sapphire.

Previous materials and methods for production of a sintered transparent window have suffered from a number of difficulties. These materials have been deficient in transmittance in certain wavelength ranges, particularly ultraviolet ranges, for example, wave lengths from about 0.2 micrometers (microns) to about 0.4 microns, as well as visible and infrared wave lengths up to about 6 microns.

Previous materials were susceptible to abrasion or erosion, for example, from high velocity impaction of dust or sand particles or rain or cloud droplets.

Previous materials were often unstable under conditions of long exposure to ultraviolet light, such that exposure to sunlight or to ultraviolet light with an intensity of about 700 microwatts/cm$^2$, on the order of 0.25 hours or more caused a reduction of the transmittance properties of the material.

Previous material have been difficult to form with the desired structural strength. In some applications it is desired to produce a transparent window which can withstand mechanical stress on the order of a pressure of about 15 psi (0.1 MPa), but which will preferably rupture when subjected to a pressure of about 25 psi (0.17 MPa) or more.

Certain previous materials, e.g. MgO, are hygroscopic and become cloudy upon exposure to moisture, rendering the optical qualities of the material unacceptable.

Previous production methods have been costly to practice and have required a number of difficult steps making the windows impractical to produce in quantity.

Accordingly, a number of advantages would be realized by methods and materials for producing a transparent window having high transmissivity, particularly in the ultraviolet spectral region, as well as in the infrared region (e.g., about 3 to 5 microns), high resistance to erosion or abrasion, low susceptibility to deterioration from ultraviolet light, a desired degree of strength, low cost and ease of manufacture.

SUMMARY OF THE INVENTION

According to the present invention, a polycrystalline body is produced having a high in-line transmittance and, particularly, a transmittance greater than that depicted by line A in FIG. 1. The body preferably comprises magnesia-alumina spinel. The body preferably has, in its uncoated state, and with a thickness of about 1.88 mm, a transmittance not less than about 80 percent, preferably not less than about 85 percent, and more preferably not less than about 87 percent, in all wavelengths from 0.3 to 0.8 microns and not less than about 60 percent, preferably not less than about 72 percent, and more preferably not less than about 77 percent, at some wavelength from 0.2 to 0.3 microns. The material retains at least about 90 percent and preferably at least about 99 percent of its original transmissivity after as much as 240 hours or more of exposure to ultraviolet light of a wave length between about 0.2 and about 0.4 microns. The sintered body has a flexural strength of at least about 15,000 psi (about 100 MPa) and preferably at least about 20,000 psi (about 140 MPa), most preferably at least about 28,000 psi (about 200 MPa).

The sintered transparent body can be produced by a two-step process involving forming a closed porosity body in a first step and reducing residual porosity in a second step. The method comprises forming a powder, preferably of spinel, and preferably having less than 0.005 weight percent of certain impurities. The powder is formed into a closed porosity body. The closed porosity body can be formed by, e.g., hot pressing or pressureless sintering. The closed porosity body is then hot isostatic pressed at a temperature of at least about 1400° C. under a pressure of at least about 15,000 psi (about 100 MPa). The sintered body produced by this method has a porosity less than about 0.001 percent, and, in a thickness of about 1.88 mm, an in-line transmittance greater than or equal to that depicted by line A in FIG. 1.

A method of producing transparent spinel is disclosed in copending U.S. patent application Ser. No. 047,428 titled "Method for Producing Transparent Polycrystalline Body With High Ultraviolet Transmittance". A dome and window produced from transparent spinel is disclosed in copending U.S. patent application Ser. No. 047,422 titled "Dome And Window for Missiles And Launch Tubes With High Ultraviolet Transmittance".

DETAILED DESCRIPTION OF THE PREFERRED EMBODIMENTS

Figure 1:
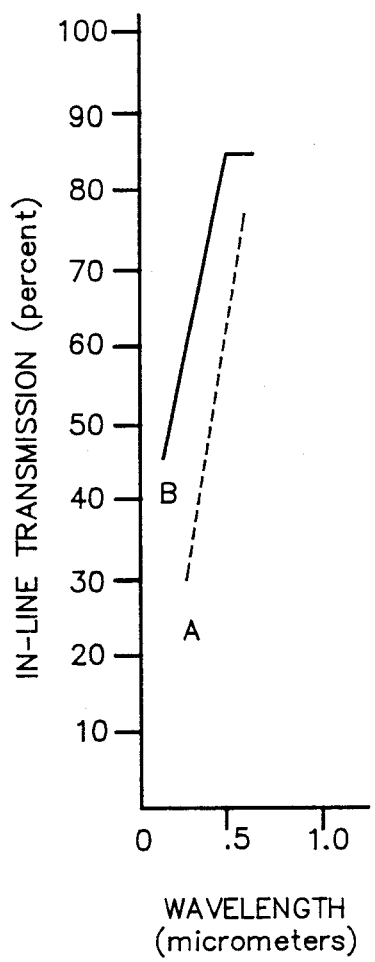
FIG. 1 illustrates a preferred and a more preferred in-line transmission of polycrystalline bodies made according to the present invention.
Figure 2:
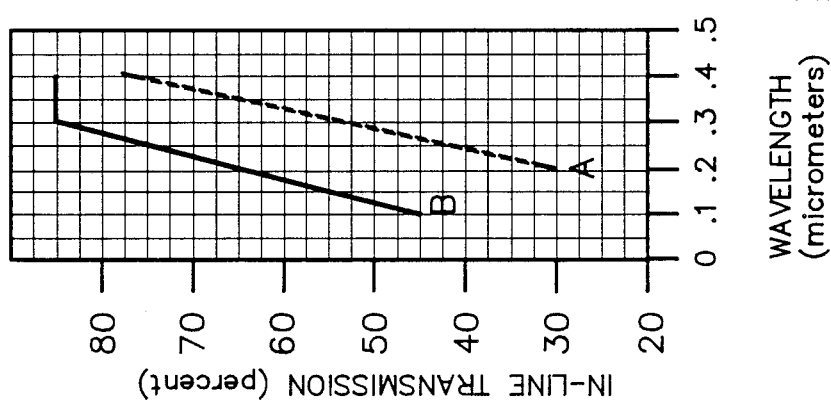
FIG. 2 depicts the transmission curves of FIG. 1 in greater detail.

According to the present invention, there is provided a sintered polycrystalline body which is highly transparent, particularly in the ultraviolet region between about 0.2 and about 0.4 microns wavelength. The sintered bodies produced according to the present invention have an in-line transmittance greater than or equal to the transmittance depicted by line A in FIGS. 1 and 2. The materials of the present invention are capable of a transmittance even greater than that depicted by line A in FIGS. 1 and 2 and, accordingly, the present invention also includes producing a sintered body with a transmittance greater than or about equal to that depicted by line B in FIGS. 1 and 2. The sintered body of the present invention also has good transmittance in the infrared wavelength region, having an in-line transmittance per 1.88 mm thickness at all wavelengths from 3 microns to 5 microns of not less than about 73 percent, preferably not less than about 76 percent, and, at all wavelengths from about 3 microns to 4 microns of not less than about 81 percent, preferably not less than about 84 percent.

The body preferably has, in its uncoated state and with a thickness of about 1.88 mm, a transmittance not less than 85 percent in all wavelengths from 0.3 to 0.8 microns and not less than about 72 percent at some wavelength from 0.2 to 0.3 microns. Further, the body preferably has a transmittance not less than about 73 percent in all wavelengths from about 3 microns to about 5 microns and has a transmittance of at least about 86 percent at some wavelength from about 0.2 to about 0.4 microns. The body preferably has, in its uncoated state and with a thickness of about 1.88 mm, a transmittance greater than about 30 percent, preferably greater than 40 percent, and most preferably greater than about 45 percent, at a wavelength of about 0.2 microns and a transmittance greater than about 84 percent and preferably greater than about 85 percent at a wavelength of about 0.4 microns.

Figure 3:
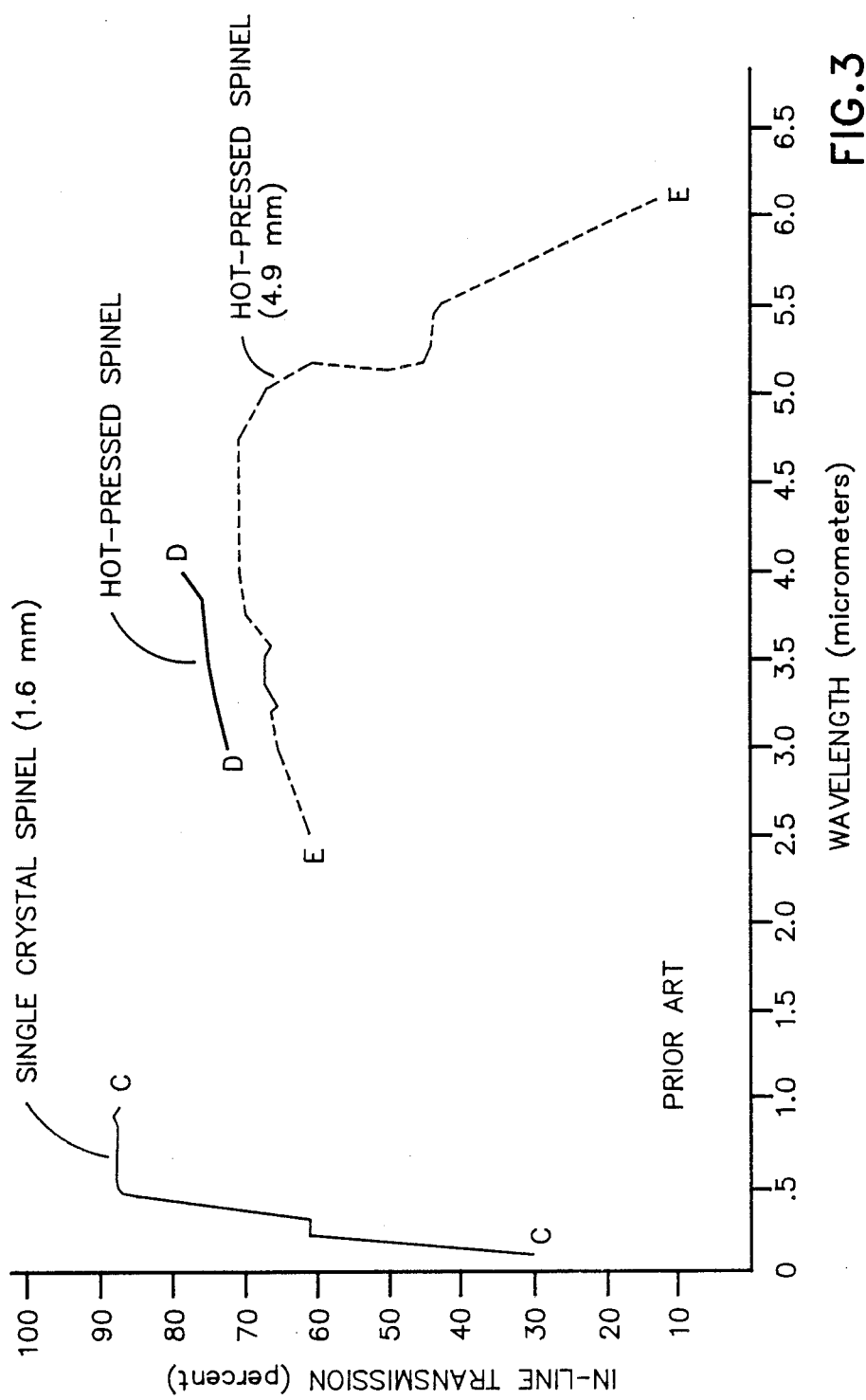
FIG. 3 illustrates spectral transmission curves of single crystal and hot-pressed spinel bodies made by methods other than those of the present invention.
Figure 4:
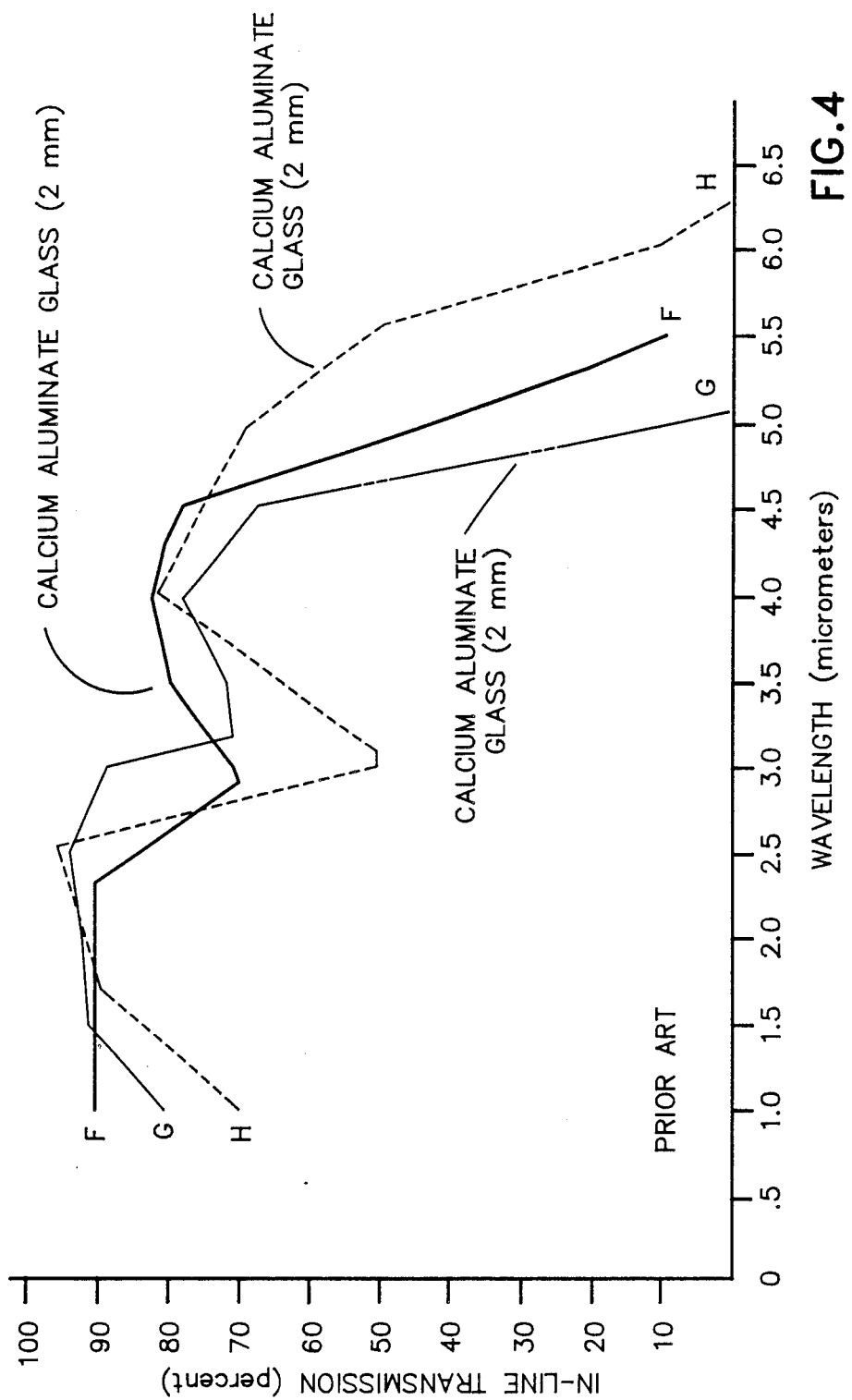
FIG. 4 illustrates spectral transmission curves of calcium aluminate glasses.
Figure 5:
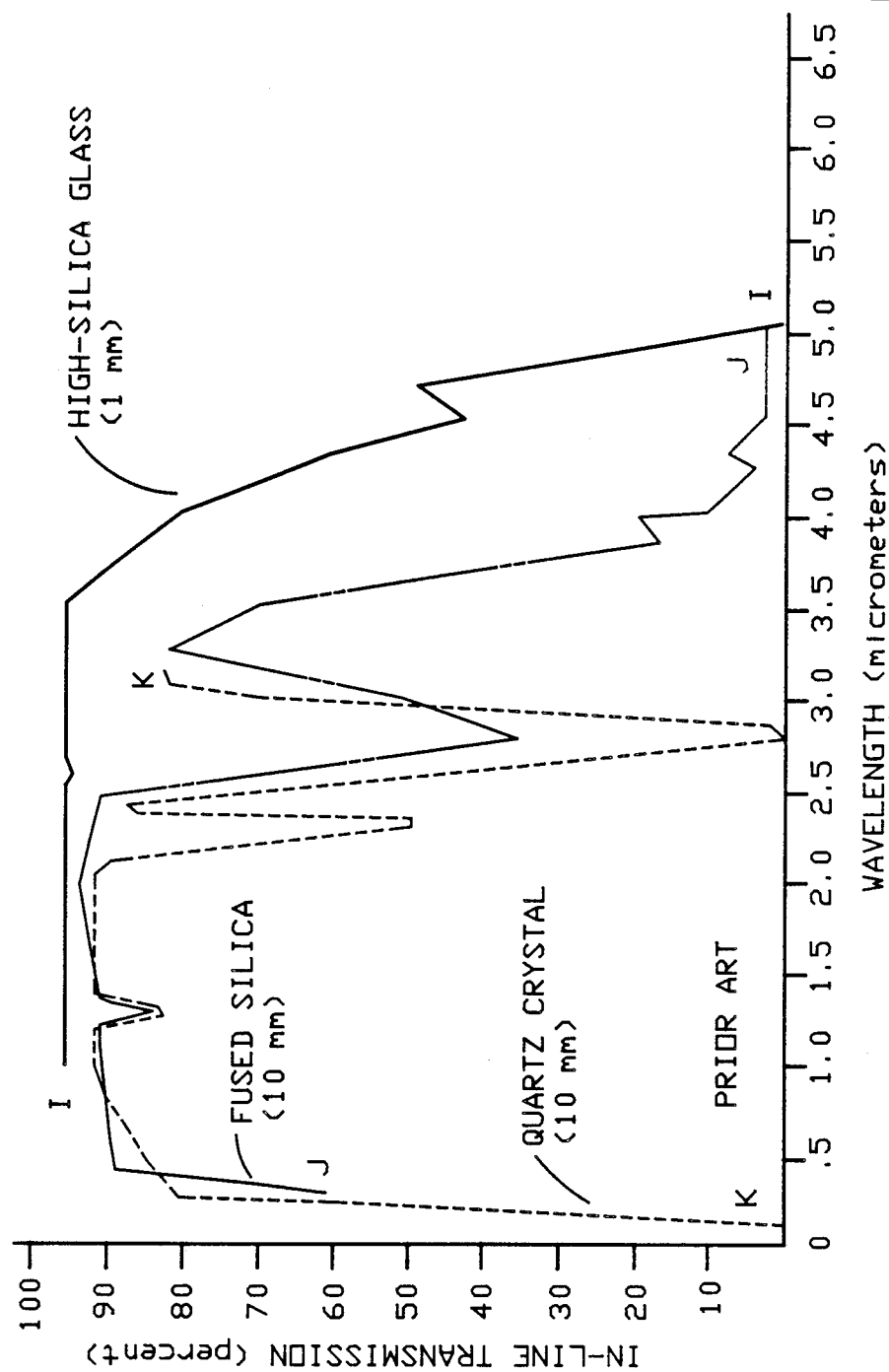
FIG. 5 illustrates spectral transmission curves of quartz crystal and silica and fused silica glass.
Figure 6:
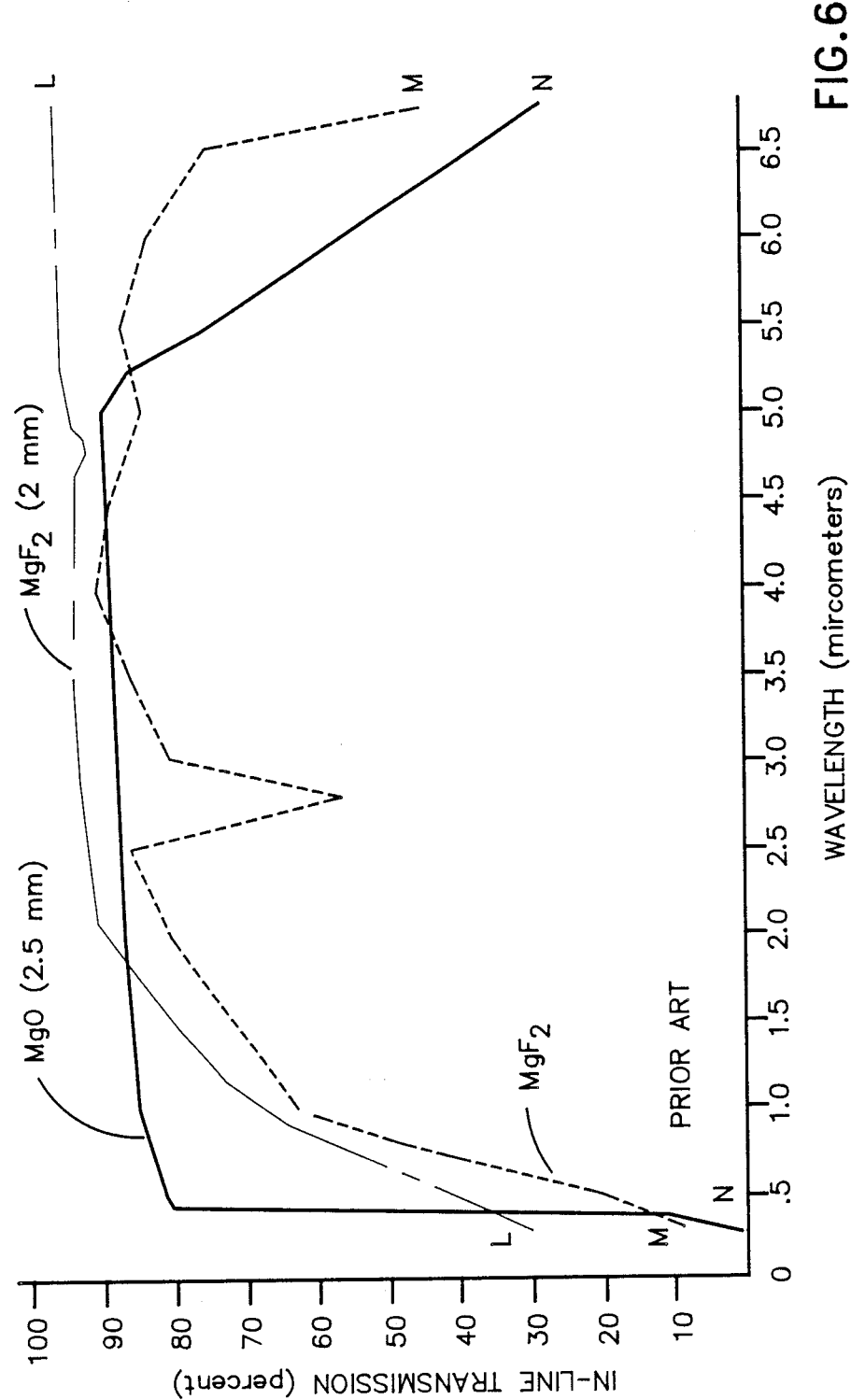
FIG. 6 illustrates spectral transmission curves of MgO and MgF$_2$.
Figure 7:
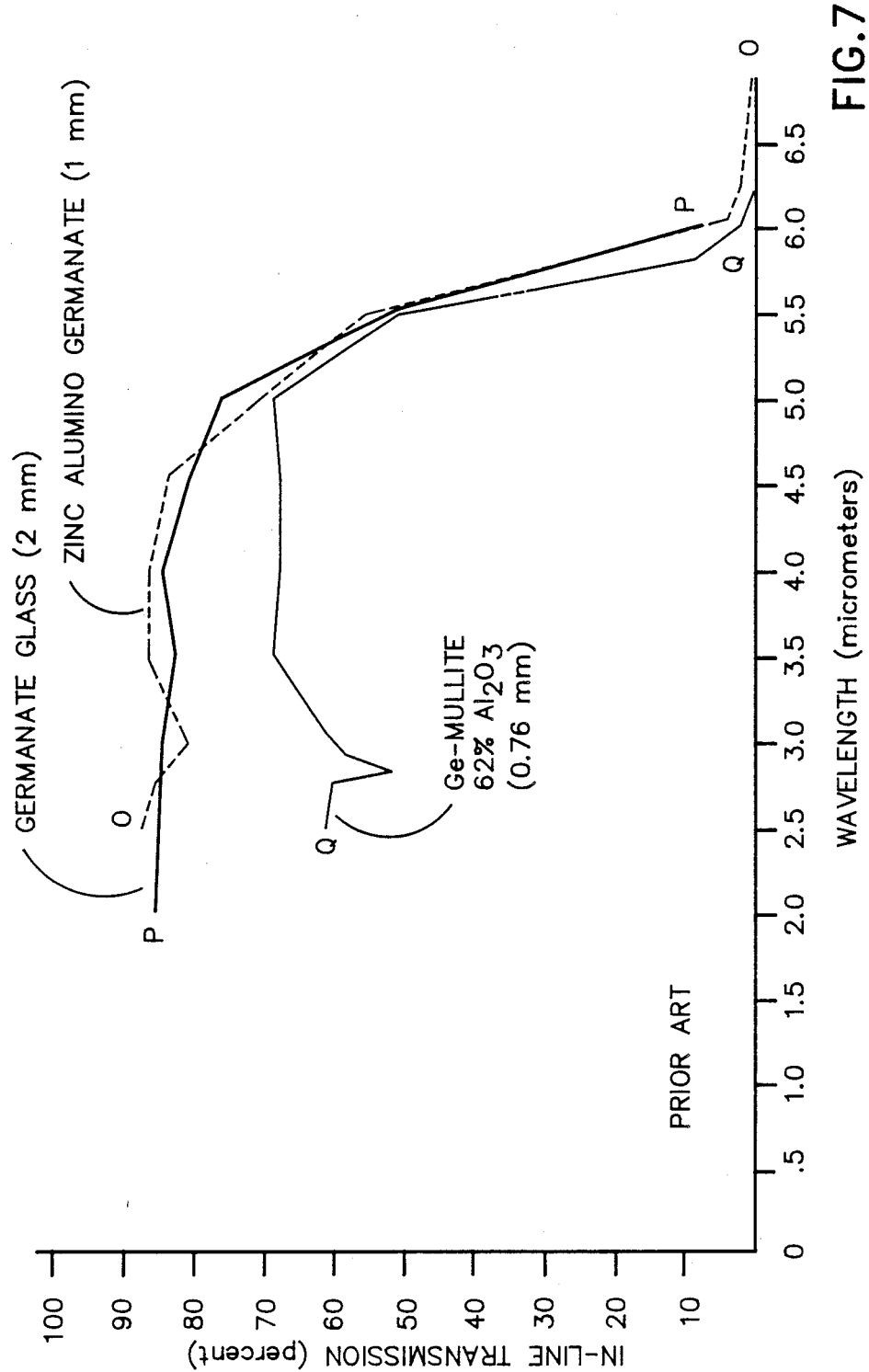
FIG. 7 illustrates spectral transmission curves of zinc alumino germanate and germanate glasses.
Figure 8:
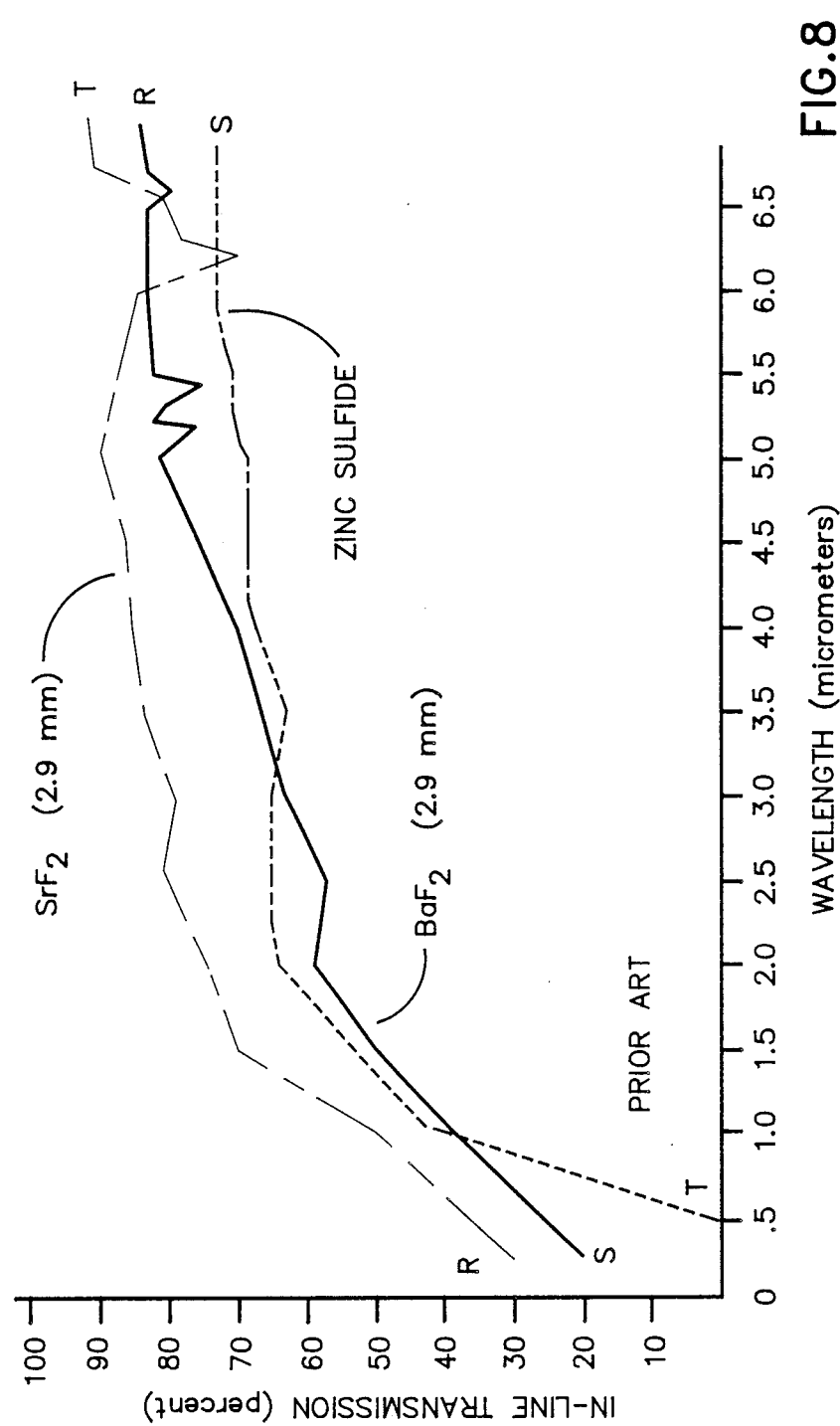
FIG. 8 illustrates spectral transmission curves of SrF$_2$, BaF$_2$, and zinc sulfide.
Figure 9:
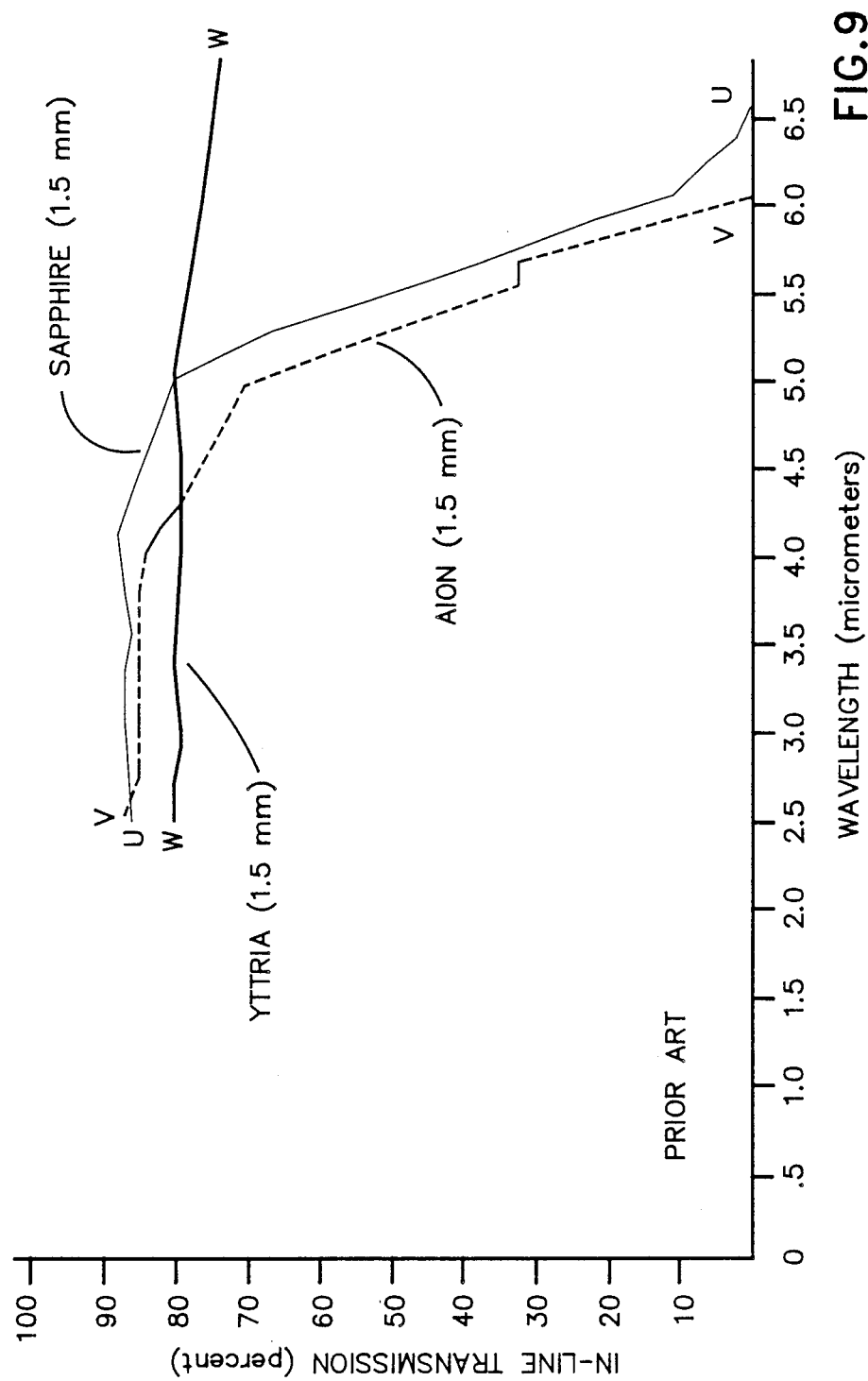
FIG. 9 illustrates spectral transmission curves of sapphire, AlON, and yttria.

Lines C through E of FIG. 3, provided for purposes of comparison, depict transmittance reported for spinel bodies produced by previous methods Lines F through W of FIGS. 4-9 depict transmittances reported for sintered bodies made of non-spinel materials as described in Table 1, and are provided for comparison purposes.

TABLE 1

| Curve | Fig. | Material | Thickness (mm) |
| --- | --- | --- | --- |
| C | 3 | single-crystal spinel | 1.6 |
| D | 3 | hot-pressed spinel | — |
| E | 3 | hot-pressed spinel | 4.9 |
| F | 4 | calcium-aluminate glass | 2 |
| G | 4 | calcium-aluminate glass | 2 |
| H | 4 | calcium-aluminate glass | 2 |
| I | 5 | high-silica glass | 1 |
| J | 5 | fused silica | 10 |
| K | 5 | quartz crystal | 10 |
| L | 6 | MgF$_2$ | 2 |
| M | 6 | MgF$_2$ | — |
| N | 6 | MgO | 2.5 |
| O | 7 | zinc alumino germanate | 1 |
| P | 7 | germanate glass | 2 |
| Q | 7 | Ge-mullite 62% Al$_2$O$_3$ | 0.76 |
| R | 8 | SrF$_2$ | 2.9 |
| S | 8 | BaF$_2$ | 2.9 |
| T | 8 | zinc sulfide | — |
| U | 9 | sapphire | 1.5 |
| V | 9 | AlON | 1.5 |
| W | 9 | yttria | 1.5 |

Figure 12:
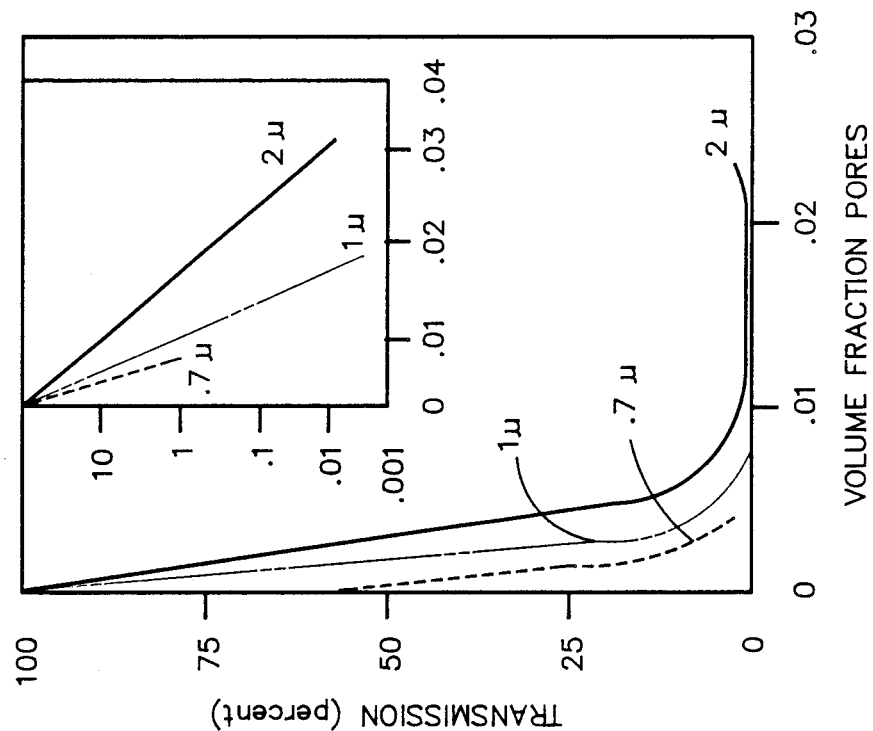
FIG. 12 illustrates a relationship between optical transmission and porosity used to obtain porosity from measurements of optical transmission.

A sintered body produced according to the present invention comprises spinel and preferably contains more than about 99.9 weight percent spinel. Spinel is a useful material for optical applications such as instrument ports because, among other reasons, spinel is non-birefringent, has a cubic structure, and is substantially non-hygroscopic. The sintered transparent body has a porosity of less than 0.01 percent, preferably less than about 0.001 percent by volume and an average pore radius less than about 0.1 microns. Porosity in such low range is difficult to measure by ordinary displacement methods. Porosity can be measured using electron micrographs of the sintered body. Another method of determining porosity is to calculate porosity from measured light transmittance, e.g. by using the graphical relationship depicted in FIG. 12, which applies generally to material such as the material which is the subject of this invention.

The polycrystalline body of the present invention has a scatter of less than about $9 \times 10^{-3}$, preferably less than about $8 \times 10^{-3}$, and most preferably less than $7 \times 10^{-3}$ at a wavelength of about 0.6471 microns.

The sintered body can be polished to a scratch-dig size of less than about 20-20. The scratch-dig size of 20-20 represents a maximum scratch size of 0.020 mm (0.0008 inches) in width and a maximum dig size of 0.20 mm (0.008 inches) in diameter. In this context, a scratch is a defect which is long and thin in nature and a dig is a defect which is basically round. The meaning of scratch-dig size is explained fully in Mil-013830, pp. 32-34, incorporated herein by reference. The sintered body has an average grain size less than about 150 microns. The sintered body has an average defect radius of less than about 0.005 inches (about 0.12 mm).

The sintered body of the present invention provides a relatively low emissivity in the infrared wavelength regions at elevated temperatures. High emissivities interfere with optics measurements and can be detrimental to optical guidance systems such as situations in which missile nose cones are aerodynamically heated during flight. Table 2 provides a comparison of emissivities of hot-pressed spinel with those of sapphire at various temperatures. Although the hot-pressed spinel represented in Table 2 is not made according to the claimed invention, since emissivities are primarily material-dependent, it is believed emissivities of spinel material made in accordance with the present invention has emissivities no greater than about those shown in Table 2 for hotpressed spinel.

TABLE 2

| Temp. (°C.) | Emissivity at 4.5 and 5.0 Microns | | | |
|---|---|---|---|---|
| | Emissivity at 4.5 microns | | Emissivity at 5.0 microns | |
| | spinel | sapphire | spinel | sapphire |
| 30 | 0.078 | 0.051 | 0.157 | 0.199 |
| 200 | 0.091 | 0.074 | 0.203 | 0.268 |
| 400 | 0.118 | 0.119 | 0.280 | 0.370 |
| 600 | 0.151 | 0.168 | 0.361 | 0.477 |
| 800 | 0.194 | 0.229 | 0.461 | 0.587 |
| 1000 | 0.247 | 0.311 | 0.559 | 0.686 |
| 1200 | 0.303 | 0.381 | 0.664 | 0.777 |
| 1400 | 0.381 | 0.468 | 0.788 | 0.848 |

The sintered body of the present invention has a flexural strength, measured according to the ASTM F417 test, measured at 25° C., of at least about 15,000 psi (100 MPa), preferably at least about 20,000 psi (140 MPa), and most preferably at least about 23,000 psi (about 150 MPa). The sintered body has a tensile strength, measured according to the ACMA #4 test of at least about 12,000 psi (about 80 MPa). The material, however, is not so strong that it will resist bursting at a desired level. The sintered body of the present invention, when provided in a 3 inch (7.5 cm) diameter disk having a thickness of about 0.06 inches (1.5 mm), bursts when subjected to a pressure of more than about 25 psi (about 0.17 MPa).

The sintered body of the present invention is resistant to abrasion or erosion, and particularly, when subjected to dust, sand or water droplets at a velocity of about 500 meters per second, undergoes substantially no degradation of transmittance properties. The sintered body of the present invention has a Knoop hardness, measured according to the ASTM E18 test of greater than 1350 kg/mm$^2$, preferably greater than 1500, and most preferably about 1700.

The sintered body of the present invention is resistant to degradation under high temperature conditions and, in particular, has a high melting point, preferably above 2000° C.

The sintered body of the present invention is stable under exposure to ultraviolet light, and particularly, experiences a loss of transmissivity of less than about 1 percent after being subjected to sunlight or at a distance of about 6 inches (15 cm) to ultraviolet radiation of an intensity of about 700 microwatts/cm$^2$ having a wave length of about 0.254 microns for about 240 hours.

The sintered body of the present invention is chemically and thermally stable. The polycrystalline material of the present invention has a solubility of less than $10^{-3}$ g/100 g water at room temperature. The polycrystalline body has substantially no solubility in an acidic aqueous solution having a pH of between about 7 and about 2. There is substantially no degradation of the body upon exposure to oxidizing materials and there is substantially no degradation of the body upon exposure to temperatures of about 500° C. In this context, substantially no degradation means that the strength, hardness and optical qualities of the material are substantially preserved. In particular, upon exposure to oxidizing materials or to temperatures of about 500° C., the body possesses a knoop hardness of at least about 1038, Kg/mm$^2$ a flexure strength of at least about 15,00 psi, and in-line transmittance per 1.88 mm thickness in all wavelengths in the wavelength range from about 0.2 microns to about 0.4 microns of not less than the transmittance shown by Line A in FIG. 2.

For purposes of comparison, absorption coefficients of other materials are given in Table 3, in which "HP" indicates hot-pressed.

TABLE 3

| Material | Absorption Coefficients (cm$^{-1}$) | | | | | |
|---|---|---|---|---|---|---|
| | Wavelength (microns) | | | | | |
| | 3.0 | 4.0 | 4.5 | 5.0 | 5.5 | 6.0 |
| Temperature = 17-25° C. | | | | | | |
| Spinel (HP) | .0007 | .0332 | .135 | .465 | 1.16 −.8 −2 | 3.07 |
| Sapphire | .0013 | .061 | .252 | .81 | 2.07 | 5.66 |
| AlON | | | .5 | 1.6 | | |
| Zirconia | | | | | 0.5 | 1.5 |
| Yttria | .0001 | .0003 | .0021 | .001 | .037 | .11 −.15 |
| Temperature = 127° C. | | | | | | |
| Spinel (HP) | .0010 | .046 | .186 | .614 | 1.51 | 3.38 |
| Sapphire | .0019 | .083 | .333 | 1.6 | 2.63 | 6.95 |
| Yttria | .001 | .0006 | .0038 | .0017 | .061 | .186 |
| Temperature = 227-250° C. | | | | | | |
| Spinel (HP) | .0015 | .0646 | .243 | .7— .802 | 1.95 −2.3 | 4.74 |
| Sapphire | .0028 | .113 | .437 | 1.3— 1.4 | 3.3 −3.4 | 8.48 |
| AlON | | | 0.9 | 2.4 | | |
| Zirconia | | | | | 0.9 | 2.4 |
| Temperature = 477-500° C. | | | | | | |
| Spinel (HP) | .0038 | .135 | .475 | 1.3— 1.46 | 3.4 −3.7 | 7.68 |
| Sapphire | .0069 | .233 | .826 | 2.1— 2.46 | 5.1 −5.65 | 13.38 |
| AlON | 1.3 | 3.7 | | | | |
| Zirconia | | | | | 2.0 | 4.5 |
| Yttria | .0001 | .003 | .019 | .072 | .23 | 0.6 |
| Temperature = 727° C. | | | | | | |
| Spinel (HP) | .008 | .244 | .809 | 2.35 | 5.3 | 11.19 |
| Sapphire | .014 | .417 | 1.38 | 2.93 | 8.6 | 19.15 |
| Yttria | .00011 | .009 | 0.42 | .15 | .45 | 1.13 |

The method preferred for producing the transparent sintered body will now be described. According to the method of the present invention, a magnesia-alumina spinel powder is provided. The spinel powder is of high purity, and particularly, has less than about 5 ppm by weight, preferably less than 3 ppm, of oxides of any of the following elements: Cr, Cu, Fe, Ga, Mn, Pb, Ti, V, Zn, and has less than 50 ppm, preferably less than 30 ppm of the total of all the above oxides. The powder preferably has less than 1,000 ppm, preferably less than 10 ppm of carbon, less than 10 ppm, preferably less than 5 ppm of calcium, less than 30 ppm, preferably less than 5 ppm of sodium, less than 500 ppm, preferably less than 100 ppm of sulfur, less than 1,000 ppm, preferably less than 50 ppm of silicon.

Figure 11:
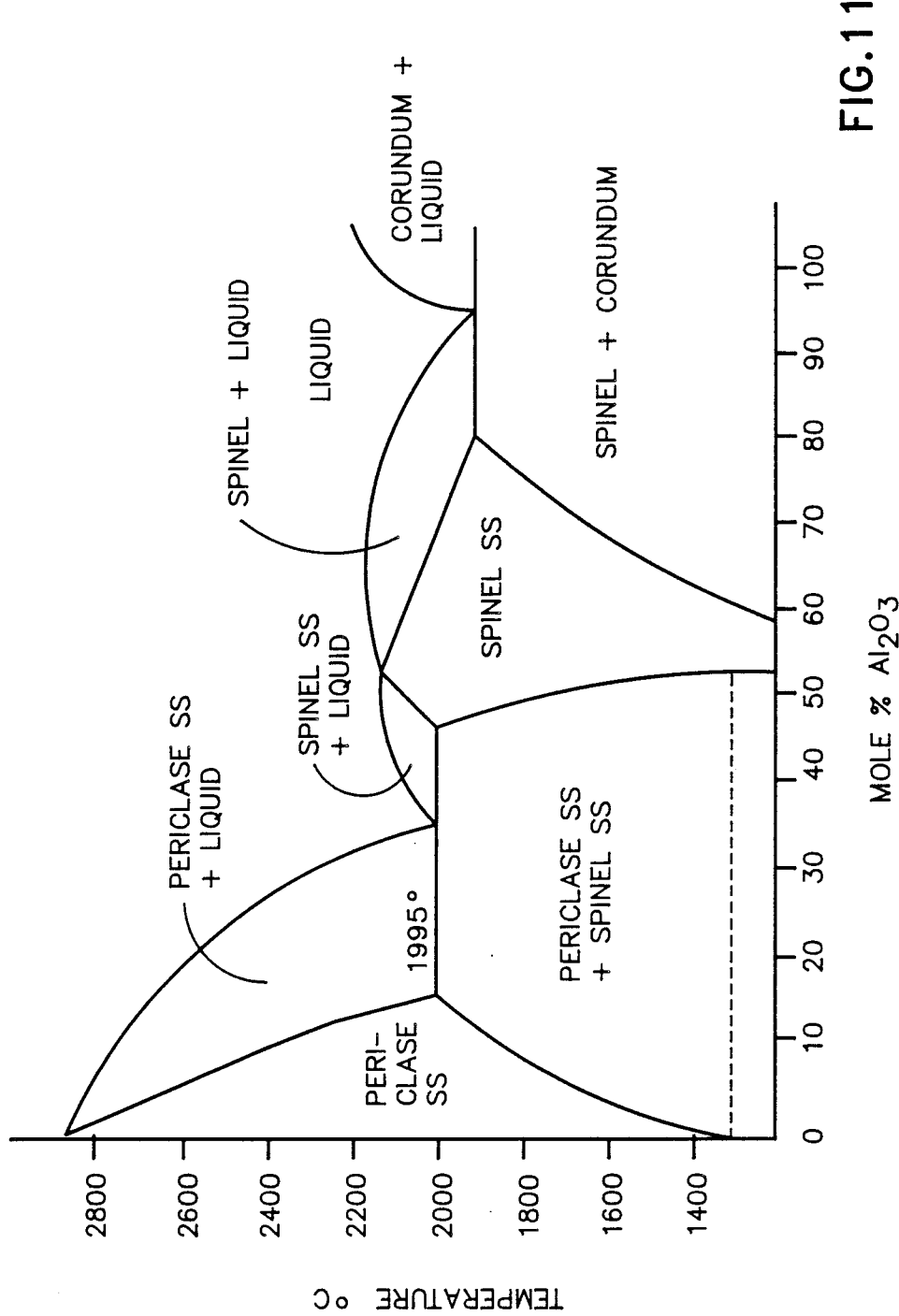
FIG. 11 depicts a phase diagram for the MgO-Al$_2$O$_3$-spinel system.

The magnesia-alumina powder is a mixture of a powder of MgO and a powder of $Al_2O_3$. The mixture can be in any weight ratio of $Al_2O_3$ to MgO approximately falling in the range indicated by "spinel SS" in FIG. 11. Preferably, the molar ratio of $Al_2O_3$ to MgO in the powder is about 1:1 plus or minus about 5 M/O. The powder preferably has a surface area of between about 10 and about 15 $m^2/g$. The average particle size of the powder is substantially submicron and preferably between 40 and 50 weight percent of the particles have a diameter less than about 1 micron.

The powder is used to form a closed porosity body. The formation of a closed porosity body can be accomplished by hot pressing or pressureless sintering. According to the hot pressing method, the powder is mixed with an amount of hot-pressing aid, e.g., between about 0.5 weight percent and about 3 weight percent, preferably about 1½ weight percent of LiF.

The mixed powder is loaded in a hot press die. The powder compacts substantially upon pressing. The thickness desired for the hot pressed parts preferably will include an allowance for grinding. For example, a finished 0.3 inch (8 mm) thick disk may require the addition of about 0.015 inch (about 0.3 mm) for grind allowance.

The hot press die may be made of graphite, for example, in the form of a cylindrical annulus. A cylindrical bottom die is placed in the bottom of the hot press die. All surfaces of the dies which will be exposed to the spinel are coated with a graphite foil.

According to one method of hot pressing, a single window is produced for each hot pressing operation According to another hot pressing method, a number of windows are hot pressed simultaneously such as by vertically stacking two or more layers of spinel powder, separated by a parting medium such as graphite or boron nitride. When several windows are hot pressed simultaneously, the spinel layers are preferably separated by graphite spacers sufficiently thick to prevent fracture of the spacers. Spacers of about ½ inch (1.2 cm) thickness are operable, although thinner spacers may also be operable. Products can be produced in a number of shapes including disks and domes.

After the powder and any parting medium is placed into the die, a top punch is placed into the top of the die. For disks, the top punch is a cylindrically-shaped punch and for domes, the top punch is preferably a male punch.

The prepared and filled die is cold pressed at about 100 psi (0.7 MPa). The cold-press pressure must be sufficient to provide for ease of handling and also assists in slightly compacting the powder prior to placing the die in the main press. The cold press pressure must not, however, be so high that closed porosity results.

The cold-pressed body can be treated to fully or partially remove impurities such as conducting a vacuum bake at about 1100° C. to about 1300° C., preferably about 1200° C. to remove volatile impurities. Alternatively, the impurities can be removed during the step of forming closed porosity.

After cold pressing, the die is placed in a quartz cylinder, separated therefrom by an insulating material such as graphite felt. The cold pressed bodies in the die are then subjected to hot pressing. The hot press step can be achieved in an inert gas atmosphere, but is preferably conducted under a vacuum. The actual vacuum which is achieved during hot pressing will depend in part upon the rate at which impurities or other materials out-gas. Apparatus capable of producing about 60 microns of vacuum will suffice. Note that in the discussion that follows with regard to the hot press step, the temperatures are those measured at the top surface of the die by a direct optical method. These temperatures are not necessarily equal to the temperatures of the spinel. Before any pressure is applied, the die is first heated to about 1125° C. Heating is preferably achieved by an induction heating method. The spinel is held at about 1125° C. for about 30 minutes. The pressure and temperature are then both linearly increased over a period of about 1 to 5 hours. The rate of temperature rise and the rate of pressure rise are selected such that the target temperature is never reached substantially before the target pressure is reached. For disks, the target temperature is at least about 1400° C., preferably about 1410° C. The target pressure is at least about 2000 psi (about 13 MPa), preferably about 2200 psi (about 15 MPa). For domes, the target temperature is at least about 1395° C. and preferably about 460° C., and the target pressure is at least about 2000 psi (about 13 MPa), preferably about 3200 psi (about 22 MPa). A temperature which is too high will result in a substantial amount of sublimation of the spinel. A temperature which is too low may result in decreased transparency of the product. Pressures higher than the target pressure are believed to be operable but cause excessive wear of the dies. Pressures lower than the target pressure result in compaction less than that desired and inferior optical clarity. During hot pressing, the spinel normally loses about 3½ weight percent to sublimation.

The spinel is held at the target pressure and temperature for a period of time. The period of time for disks is about 2 to 5 hours. The period of time for domes is about 4 hours.

Following holding at the target temperature and pressure, the heating and pressure are reduced. Cooling occurs in about 12 to 14 hours. When domes are being pressed, after the die has cooled to about 1000° C., it is preferred to reduce the vacuum and to fill the die with a noble gas such as argon.

Another method for producing a closed porosity body is by pressureless sintering. Pressureless sintering, as compared to a hot press process, permits easier control of grain growth during the closed porosity formation step and is more useful in formation of parts having complex geometry. Hot-pressing is, in general, not as suitable for formation of complex-geometry parts. According to this method, the spinel powder is mixed with an amount of binder such as about 5 weight percent of carbowax, and may optionally also be mixed with materials such as surfactants, or lubricants, such as neofat. The powder mix is then compressed at substantially room temperature or is slip cast at room temperature to produce a green body. The green body is then exposed to a temperature, such as greater than about 1800° C. preferably at substantially sub-atmospheric pressure, e.g., about 100 psi (0.7 MPa) The atmosphere during said pressureless sintering can be hydrogen or vacuum.

The closed porosity body typically has some amount of residual porosity. The hot pressed body typically has a porosity of about 0.01 volume percent or more. The pressureless sintered body typically has porosity of about 1 volume percent or more. In order to produce a body with the desired characteristics, the body is subjected to a second treatment step to reduce or eliminate the residual porosity. According to the present invention, the second step is a hot isostatic pressure treatment. The closed-porosity bodies are preferably inspected for visually-apparent defects and for minimum ultraviolet transmission such as about 65-85 percent transmission of an ultraviolet source having an intensity peak at a wavelength of about 0.25 microns. The parts, preferably separated by graphite spacers, are loaded into a hot-isostatic pressing chamber. The hot isostatic treatment includes heating the body to a target temperature of about 1500° C. to 2000° C., preferably less than about 800° C., preferably at least about 1500° C. Heating can be accomplished by a resistance heater furnace. The maximum temperature is achieved in an atmosphere which has been pressurized to at least about 15,000 psi (about 100 MPa), preferably more than 25,000 psi (about 170 MPa), and most preferably at least about 29,500 psi (about 205 MPa). The hot isostatic pressure atmosphere is preferably argon or helium. A number of rates of pressurization and heating and depressurization and cooling are operable. In one preferred embodiment, the chamber is pressurized to about 5,000 psi (about 34 MPa) without heating. The temperature and pressure are then increased linearly such that the target temperature and target pressure are arrived at essentially simultaneously. The heating is at a rate of between about 5° C. per minute and about 25° C. per minute, preferably about 15° C. per minute. The target temperature and target pressure are maintained for a period between about ½ hour and about 5 hours, preferably about 2¼ hours. In general, there is an inverse relationship between temperature and hold time, i.e., at higher temperatures, a shorter hold time will be operable. After the hold time or "soak" period, a controlled cool-down is used. The pressure is decreased linearly during the cool-down period at such a rate that when the temperature reaches 600° C., the pressure will be about 10,000 psi (about 70 MPa). The preferred cooling rate is about 5° C. per minute down to the temperature of 600° C. Too rapid cooling, such as more than about 15° C. per minute, may cause thermal shock. After a temperature of 600° C. has been achieved, the furnace is turned off. The pressure, during this period, is decreased linearly at a rate such that when the temperature is 300° C., the pressure is about 7,500 psi (about 50 MPa). At this point, the pressure is allowed to freely vent to the atmosphere and the parts are allowed to cool to a temperature at which they can be handled. Normally, there will be no weight loss of the spinel parts during the hot-isostatic pressing procedure.

In one embodiment of the process, the two steps of the process are accomplished without substantial cooling of the body between steps. According to this method, a formed but unfired compact is sintered to a closed porosity state in a vessel at about atmospheric pressure in an $H_2$ atmosphere or a sub-atmospheric pressure in a vacuum atmosphere, and at a temperature of about 1400° C. Because this process does not require a hot-press step to form the closed porosity body, it can be used in formation of bodies having complex geometry. Hot press techniques are generally not suitable for forming complex geometry bodies. After the compact is sintered to a closed porosity state, the vessel is pressurized to at least about 20,000 psi (about 140 MPa), without substantial cooling of the body, at a temperature of at least about 1400° C. to accomplish the hot isostatic pressure step of the process and reduce or eliminate residual porosity of the body.

Following the hot isostatic pressing step, the body is cooled and is subjected to further steps to modify the surface characteristics of the body. These further steps can include grinding and polishing, application of an anti-reflection coating and metallizing.

In view of the foregoing discussion, many advantages of the magnesia-alumina spinel material discussed herein are apparent. The material has a high in-line transmittance, particularly in the ultraviolet wavelength region, low emissivity in the infrared wavelength regions and is non-birefringent, has a cubic structure, is highly pure, is substantially non-hygroscopic, and has a low porosity The magnesia-alumina spinel discussed herein also has a high melting point, is chemically and thermally stable, and is stable under exposure to ultraviolet light. The magnesia-alumina spinel further has high flexural and tensile strength, as well as high abrasion and erosion resistance.

The magnesia-alumina spinel of the present application is particularly useful in numerous applications because of its unique properties as discussed above. For example, the material can be used as a safety window for applications in which a window will be subjected to high pressure, temperature, abrasion, or force. For example, the material can be used in a pressure vessel sight glass, a furnace sight glass, or a windshield for a vehicle. Such vehicles could include, for example, automobiles, trucks, road working equipment, military vehicles, and all types of aircraft.

The magnesia-alumina spinel of the present invention is also particularly useful as a window in a universal product code ("UPC") bar code scanning device. Such windows are used in, for example, both counter top units and hand held laser pistols.

The magnesia-alumina spinel of the present application is also particularly useful as a waveguide in various applications. In particular, the material can be used as a waveguide in a surgical laser.

The material of the present invention is also useful in various optical systems. For example, the material can be used as a feed-through in an optical down hole well logging sensing system. Alternatively, the material can be used as an optical fiber connector, an optical fiber, an optical fiber sensor, and a fiber optic beam splitter.

The magnesia-alumina spinel of the present application is also useful in various electronic applications, such as a wafer, a radiation hardened RAM substrate, and a trimmer capacitor. In addition, the material can be used, for example, in a rotary encoder or a carrier disk.

The present material is also particularly suited for chromatography applications because of its high purity. For example, the magnesia-alumina spinel of the present application can be used as a pump piston, a pump cylinder, or as a chromatography column.

The present material can also be used in a number of structural applications. For example, the magnesia-alumina spinel of the present invention can be used as a water-jet cutting flow-shaper, a nozzle for process fluids, a valve flap, a valve seat, a ball bearing, or as components in devices such as high speed printers.

The present material also has application in various window-like uses. For example, the material can be used as a port for receiving and transmitting radiation signals or, more particularly, a port for missile guidance and detection. Moreover, the material can be used as a covering for a submarine or a tank port.

The magnesia-alumina spinel of the present invention can also be used a component in integrated-circuit imaging equipment or optical computers. The magnesia-alumina spinel material is also suitable for optical lenses, prisms, holographic gratings and diffraction gratings.

The magnesia-alumina spinel of the present invention is also suited for a wide variety of industrial and/or scientific applications. For example, the material can be used as a lens or enclosure for high-pressure arc lamps. The material is also useful, for example, in a flow meter, as a capillary tube, in a pressure transducer, and in a temperature sensor, particularly, a cryogenic temperature sensor. The material is also useful as a thermoset mold window, a fuse cover, for safety goggles, and any type of armor, for example, personal, industrial, or military armor.

The present material is further useful in items such as liquid ink plotting pens, watch crystals, and various types of cookware and/or scientific glassware.

EXAMPLES

EXAMPLE 1

Figure 10:
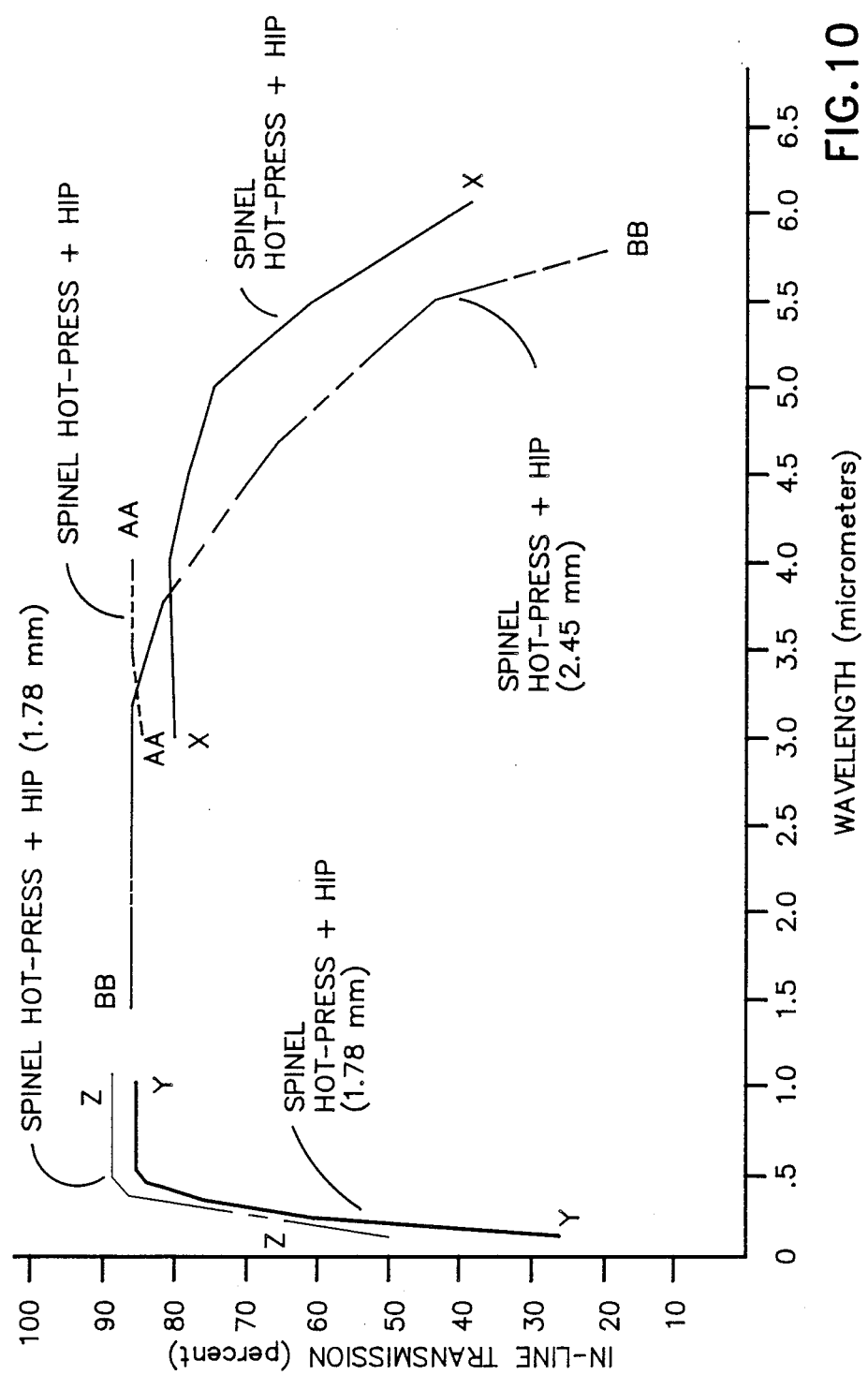
FIG. 10 illustrates spectral transmission curves of a number of samples of material made according to the present invention.

Three sintered bodies of magnesia-alumina spinel were formed and the properties thereof tested. All three bodies were formed from a powder having less than 5 parts per million by weight of oxides of any of Cr, Cu, Fe, Ga, Mn, Pb, Ti, V, and Zn and having less than 50 ppm of the total of all the above oxides. The powder had less than 1000 ppm of carbon and less than 10 ppm of calcium, less than 30 ppm sodium, less than 500 ppm sulfur, less than 1000 ppm silicon. The molar ratio of $Al_2O_3$ to MgO was 1:1. The average particle size was submicron. The powder was mixed with 1½ weight percent LiF. The powder was loaded in a graphite die and cold-pressed at about 100 psi (0.7 MPa). The cold-pressed body was hot pressed at a temperature of about 1410° C. with a uniaxial pressure of about 2200 psi (15 MPa) with a "soak" of 5 hours. After cooling, the bodies were hot isostatically pressed at a temperature of 1500° C. and a pressure of 29,500 psi. After cooling, the bodies were polished. Transmission spectra characteristic of the three bodies are shown in FIG. 10.

EXAMPLE 2

Bodies of calcium aluminate glass and bodies of spinel, the latter formed according to the process of the invention, as described in Example 1, were subjected to sunlight and an artificial ultraviolet light source, Model UVL-56 manufactured by Ultra-Violet, Inc. of San Gabriel, Calif., for periods of time indicated in Table 4. The transmission of the bodies at a wavelength of about 0.254 microns is also shown in Table 7 before such exposure to ultraviolet light and after such exposure to ultraviolet light.

TABLE 4

| Type of Body | Length of Exposure (hours) | Light Source | Transmission Before U.V. Exposure | Transmission After U.V. Exposure |
|---|---|---|---|---|
| Calcium-aluminate glass | 2 | Sunlight | 70 | 45 |
| | ½ | Artificial | 70 | 68 |
| Spinel | 244 | Sunlight | 78 | 78 |
| | 115 | Artificial | 78 | 76 |

EXAMPLE 3

To assess the damage from sand erosion, samples of material formed according to the present invention, along with plexiglass and window glass were mounted on a rotating table and blasted with 10 pounds of abrasive grit. The percent haze after the test was measured using an integrating sphere. The results are shown in Table 5.

TABLE 5

| Material | Percent Haze After Sandblast Test |
|---|---|
| Spinel - Hot press + HIP | 5 |
| Plexiglass - 1 | 79 |
| Plexiglass - 2 | 74 |
| Window Glass | 82 |

EXAMPLE 4

The Agile Rain Erosion Test, as described in Memo REG. 4062-137-72 "Rain Erosion Test of Proposed Dome Materials" was performed on the material produced according to the present invention as well as a number of other materials including $MgF_2$, $CaF_2$, Yttrium-Aluminum-Garnet, MgO, and two glasses, Vycor 7913 and Corning 1723. The materials were placed in a sample holder and attached to an accelerated sled achieving the velocities indicated in Table 6. Results of the test are shown in Table 6. Table 7 shows the resistance to damage of the materials tested in order of relative effectiveness.

TABLE 6

| Material | Thickness of $Al_2O_3$ Coating (microns) | Run No. | Velocity (km per hr/fps) | Description |
|---|---|---|---|---|
| Spinel-hot-press + HIP | None | 1 | 29/1600 | No appreciable damage |
| | None | 3 | 25.5/1400 | No damage |
| | None | 4 | 29/1600 | No damage |
| $MgF_2$ | None | 1 | 29/1600 | Completely shattered |
| | None | 2 | 29/1600 | Completely shattered |
| | None | 3 | 25.5/1400 | One surface crack |
| | None | 4 | 29/1600 | Complete breakage |
| | 2.1 | 4 | 29/1600 | Surface cracks with coating deterioration |
| | 3.9 | 4 | 29/1600 | Coating slightly deteriorated |
| $CaF_2$ | None | 1 | 29/1600 | Slight pitting with surface cracks & fractures throughout although sample intact |
| | None | 2 | 29/1600 | Surface cracks with pitting |
| | None | 4 | 29/1600 | Surface cracks with slight pitting |
| | 2.1 | 4 | 29/1600 | Coating gone - slight pitting with surface cracks |
| MgO | None | | 29/1600 | Surface cracks |
| | None | 2 | 29/1600 | Complete breakage |
| Sapphire | None | 2 | 29/1600 | Single line fracture |
| | None | 3 | 25.5/1400 | No damage |
| Yttrium-Aluminum- | None | 1 | 29/1600 | Single line fracture |

TABLE 6-continued

| Material | Thickness of Al$_2$O$_3$ Coating (microns) | Run No. | Velocity (km per hr/fps) | Description |
|---|---|---|---|---|
| Garnet | None | 3 | 25.5/1400 | No damage |
| Corning 1723 | | 2 | 29/1600 | Completely shattered |
| | | 3 | 25.5/1400 | Pitting with surface cracks |
| VyCor 7913 | | 2 | 29/1600 | Completely shattered |
| | | 3 | 25.5/1400 | Surface pitting with one surface crack |

TABLE 7

Agile Rain Erosion Test Resistance To Damage
(In Order Of Relative Effectiveness)

1. Spinel; Hot-press + HIP
2. Sapphire
3. Yttrium-Aluminum-Garnet
4. MgF$_2$ with coating
5. CaF$_2$ with coating
6. MgO
7. CaF$_2$
8. MgF$_2$
9. VyCor 7913
10. Corning 1723

Although the present invention has been described with reference to certain embodiments, it should be appreciated that further modifications can be effected within the spirit and scope of the invention as limited only by the appended claims.

What is claimed is:

1. A sintered polycrystalline body consisting essentially of magnesia-alumina spinel produced by a process comprising:
   providing a powder comprising magnesia-alumina spinel;
   producing a closed porosity body from said powder; and
   heating said closed porosity body to at least about 1400° C. at elevated pressure of at least about 20,000 psi to reduce residual porosity;
   said body having a transmittance per 1.88 millimeter thickness in all wavelengths from about 0.3 to about 0.8 microns of not less than about 85 percent.

2. A sintered polycrystalline body, as claimed in claim 1, wherein:
   said body has a flexural strength of at least about 15,000 psi.

3. A sintered polycrystalline body, as claimed in claim 1, wherein:
   said sintered body has a knoop hardness of at least about 1350 kg mm$^{-2}$.

4. A sintered polycrystalline body, as claimed in claim 1, wherein:
   said body has a grain size less than about 150 microns.

5. A sintered polycrystalline body, as claimed in claim 1, wherein:
   said body has a tensile strength of at least about 12,000 psi.

6. A sintered polycrystalline body, as claimed in claim 1, wherein:
   said body has a strength such that a 3 inch diameter disk having a thickness of about 0.6 inches bursts when subjected to a pressure of more than about 25 psi.

7. A sintered polycrystalline body as claimed in claim 1 comprising at least 99.9% magnesia-alumina spinel.

8. A sintered polycrystalline body as claimed in claim 1 wherein said step of heating said closed porosity body to at least about 1400° C. at elevated pressure of at least about 20.000 psi to reduce residual porosity is accomplished by hot isostatic pressing.

9. A sintered polycrystalline body as claimed in claim 1 wherein said body has less than 0.01% porosity.

10. A window comprising a sintered polycrystalline body consisting essentially of magnesia-alumina spinel produced by a process comprising:
    providing a powder comprising magnesia-alumina spinel;
    producing a closed porosity body from said powder; and
    heating said closed porosity body to at least about 1400° C. at elevated pressure of at least about 20,000 psi to reduce residual porosity;
    said window having a transmittance per 1.88 millimeter thickness in all wavelengths from about 0.3 to about 0.8 microns of not less than about 85 percent.

11. A pressure vessel sight glass consisting essentially of magnesia-alumina spinel produced by a process comprising:
    providing a powder comprising magnesia-alumina spinel;
    producing a closed porosity body from said powder; and
    heating said closed porosity to at least about 1400° C. at elevated pressure of at least about 20,000 psi to reduce residual porosity;
    said sight glass having a transmittance per 1.88 millimeter thickness in all wavelengths from about 0.3 to about 0.8 microns of not less than about 85 percent.

12. A furnace sight glass consisting essentially of magnesia-alumina spinel produced by a process comprising:
    providing a powder comprising magnesia-alumina spinel;
    producing a closed porosity body from said powder; and
    heating said closed porosity body to at least about 1400° C. at elevated pressure of at least about 20,000 psi to reduce residual porosity;
    said sight glass having a transmittance per 1.88 millimeter thickness in all wavelengths from about 0.3 to about 0.8 microns of not less than about 85 percent.

13. A windshield for a vehicle consisting essentially of magnesia-alumina spinel produced by a process comprising:
    providing a powder comprising magnesia-alumina spinel;
    producing a closed porosity body from said powder; and
    heating said closed porosity body to at least about 1400° C. at elevated pressure of at least about 20,000 psi to reduce residual porosity;
    said windshield having a transmittance per 1.88 millimeter thickness in all wavelengths from about 0.3 to about 0.8 microns of not less than about 85 percent.

14. A UPC bar code scanning device window comprising a sintered polycrystalline body consisting essentially of magnesia-alumina spinel produced by a process comprising:

provrding a powder comprising magnesia-alumina spinel;

producing a closed porosity body from said powder; and heating said closed porosity body to at least about 1400° C. at elevated pressure of at least about 20,000 psi to reduce residual porosity; said UPC bar code scanning device window having a transmittance per 1.88 millimeter thickness in all wavelengths from about 0.3 to about 0.8 microns of not less than about 85 percent.

15. A waveguide comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said waveguide having a transmittance per 1.88 millimeter thickness in all wavelengths from about 0.3 to about 0.8 microns of not less than about 85 percent.

16. A feed-through in an optical downhole well logging sensing system comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said feed-through in an optical downhole well logging sensing system having a transmittance per 1.88 millimeter thickness in all wavelengths from about 0.3 to about 0.8 microns of not less than about 85 percent.

17. An optical fiber connector comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said optical fiber connector having a transmittance per 1.88 millimeter thickness in all wavelengths from about 0.3 to about 0.8 microns of not less than about 85 percent.

18. A pump piston for chromatography applications comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said pump piston for chromatography applications having a transmittance per 1.88 millimeter thickness in all wavelengths from about 0.3 to about 0.8 microns of not less than about 85 percent.

19. A pump cylinder for chromatography applications comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said pump cylinder for chromatography applications having a transmittance per 1.88 millimeter thickness in all wavelengths from about 0.3 to about 0.8 microns of not less than about 85 percent.

20. A column for chromatography applications comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said column for chromatography applications having a transmittance per 1.88 millimeter thickness in all wavelengths from about 0.3 to about 0.8 microns of not less than about 85 percent.

21. A thermoset mold window comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said thermoset mold window having a transmittance per 1.88 millimeter thickness in all wavelengths from about 0.3 to about 0.8 microns of not less than about 85 percent.

22. A water-jet cutting flow-shaper comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said water-jet cutting flow-shaper having a transmittance per 1.88 millimeter thickness in all wavelengths from about 0.3 to about 0.8 microns of not less than about 85 percent.

23. A nozzle for process fluids comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said nozzle for process fluids having a transmittance per 1.88 millimeter thickness in all wavelengths from about 0.3 to about 0.8 microns of not less than about 85 percent.

24. A valve flap comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said valve flap having a transmittance per 1.88 millimeter thickness in all wavelengths from about 0.3 to about 0.8 microns of not less than about 85 percent.

25. A valve seat comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said valve seat having a transmittance per 1.88 millimeter thickness in all wavelengths from about 0.3 to about 0.8 microns of not less than about 85 percent.

26. A component in integrated-circuit imaging equipment comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said component in integrated-circuit imaging equipment having a transmittance per 1.88 millimeter thickness in all wavelengths from about 0.3 to about 0.8 microns of not less than about 85 percent.

27. A high-pressure arc-lamp enclosure comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said high-pressure arc-lamp enclosure having a transmittance per 1.88 millimeter thickness in all wavelengths from about 0.3 to about 0.8 microns of not less than about 85 percent.

28. A high-pressure arc lamp lens comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said high-pressure arc lamp lens having a transmittance per 1.88 millimeter thickness in all wavelengths from about 0.3 to about 0.8 microns of not less than about 85 percent.

29. A port for receiving and transmitting radiation signals comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said port for receiving and transmitting radiation signals having a transmittance per 1.88 millimeter thickness in all wavelengths from about 0.3 to about 0.8 microns of not less than about 85 percent.

30. A port for missile guidance and detection comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said port for missile guidance and detection having a transmittance per 1.88 millimeter thickness in all wavelengths from about 0.3 to about 0.8 microns of not less than about 85 percent.

31. A ball bearing comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said ball bearing having a transmittance per 1.88 millimeter thickness in all wavelengths from about 0.3 to about 0.8 microns of not less than about 85 percent.

32. Components in a high speed printer comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said components in a high speed printer having a transmittance per 1.88 millimeter thickness in all wavelengths from about 0.3 to about 0.8 microns of not less than about 85 percent.

33. A liquid ink plotting pen comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said liquid ink plotting pen having a transmittance per 1.88 millimeter thickness in all wavelengths from about 0.3 to about 0.8 microns of not less than about 85 percent.

34. An optical lens comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said optical lens having a transmittance per 1.88 millimeter thickness in all wavelengths from about 0.3 to about 0.8 microns of not less than about 85 percent.

35. Components for optical computers comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said components for optical computers having a transmittance per 1.88 millimeter thickness in all wavelengths from about 0.3 to about 0.8 microns of not less than about 85 percent.

36. An optical fiber comprising a sintered polycrystalline body consisting essentially of magnesia-alumina spinel produced by a process comprising;

providing a powder comprising magnesia-alumina spinel;

producing a closed porosity body from said powder; and heating said closed porosity body to at least about 1400° C. at elevated pressure of at least about 20,000 psi to reduce residual porosity;

said optical fiber having a transmittance per 1.88 millimeter thickness in all wavelengths from about 0.3 to about 0.8 microns of not less than about 85 percent.

37. A thermometer comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said thermometer having a transmittance per 1.88 millimeter thickness in all wavelengths from about 0.3 to about 0.8 microns of not less than about 85 percent.

38. An optical fiber sensor comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said optical fiber sensor having a transmittance per 1.88 millimeter thickness in all wavelengths from about 0.3 to about 0.8 microns of not less than about 85 percent.

39. A flow meter comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said flow meter having a transmittance per 1.88 millimeter thickness in all wavelengths from about 0.3 to about 0.8 microns of not less than about 85 percent.

40. A capillary tube comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said capillary tube having a transmittance per 1.88 millimeter thickness in all wavelengths from about 0.3 to about 0.8 microns of not less than about 85 percent.

41. A pressure transducer comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said pressure transducer having a transmittance per 1.88 millimeter thickness in all wavelengths from about 0.3 to about 0.8 microns of not less than about 85 percent.

42. A wafer for electronic application comprising a sintered polycrystalline body consisting essentially of magnesia-alumina spinel produced by a process comprising:
provide a powder comprising magnesia-alumina spinel;
producing a closed porosity body from said powder; and
heating said closed porosity body to at least about 1400° C. at elevated pressure of at least about 20,000 psi to reduce residual porosity;
said wafer for electronic application having a transmittance per 1.88 millimeter thickness in all wavelengths from about 0.3 to about 0.8 microns of not less than about 85 percent.

43. A cryogenic temperature sensor comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said cryogenic temperature sensor having a transmittance per 1.88 millimeter thickness in all wavelengths from about 0.3 to about 0.8 microns of not less than about 85 percent.

44. A watch crystal comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said watch crystal having a transmittance per 1.88 millimeter thickness in all wavelengths from about 0.3 to about 0.8 microns of not less than about 85 percent.

45. Safety goggles comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said safety goggles having a transmittance per 1.88 millimeter thickness in all wavelengths from about 0.3 to about 0.8 microns of not less than about 85 percent.

46. Cookware comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said cookware having a transmittance per 1.88 millimeter thickness in all wavelengths from about 0.3 to about 0.8 microns of not less than about 85 percent.

47. A rotary encoder comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said rotary encoder having a transmittance per 1.88 millimeter thickness in all wavelengths from about 0.3 to about 0.8 microns of not less than about 85 percent.

48. A fiber optic beam splitter comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said fiber optic beam splitter having a transmittance per 1.88 millimeter thickness in all wavelengths from about 0.3 to about 0.8 microns of not less than about 85 percent.

49. A covering for a submarine port comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said covering for a submarine port having a transmittance per 1.88 millimeter thickness in all wavelengths from about 0.3 to about 0.8 microns of not less than about 85 percent.

50. A covering for a tank port comprising a sintered polycrystalline body consisting essentially of magnesia-alumina spinel produced by a process comprising:
providing a powder comprising magnesia-alumina spinel;
producing a closed porosity body from said powder; and
heating said closed porosity body to at least about 1400° C. at elevated pressure of at least about 20,000 psi to reduce residual porosity;
said covering for a tank port having a transmittance per 1.88 millimeter thickness in all wavelengths from about 0.3 to about 0.8 microns of not less than about 85 percent.

51. A carrier disk comprising a sintered polycrystalline body consisting essentially of magnesia-alumina spinel produced by a process comprising:
providing a powder comprising magnesia-alumina spinel;
producing a closed porosity body from said powder; and heating said closed porosity body to at least about 1400° C. at elevated pressure of at least about 20,000 psi to reduce residual porosity;

said carrier disk having a transmittance per 1.88 millimeter thickness in all wavelengths from about 0.3 to about 0.8 microns of not less than about 85 percent.

52. A radiation hardened RAM substrate comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said radiation hardened RAM substrate having a transmittance per 1.88 millimeter thickness in all wavelengths from about 0.3 to about 0.8 microns of not less than about 85 percent.

53. A trimmer capacitor comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said trimmer capacitor having a transmittance per 1.88 millimeter thickness in all wavelengths from about 0.3 to about 0.8 microns of not less than about 85 percent.

54. A prism comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said prism having a transmittance per 1.88 millimeter thickness in all wavelengths from about 0.3 to about 0.8 microns of not less than about 85 percent.

55. Armor comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said armor having a transmittance per 1.88 millimeter thickness in all wavelengths from about 0.3 to about 0.8 microns of not less than about 85 percent.

56. A fuse cover comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said fuse cover having a transmittance per 1.88 millimeter thickness in all wavelengths from about 0.3 to about 0.8 microns of not less than about 85 percent.

57. A holographic grating comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said holographic grating having a transmittance per 1.88 millimeter thickness in all wavelengths from about 0.3 to about 0.8 microns of not less than about 85 percent.

58. A diffraction grating comprising a sintered polycrystalline body consisting essentially of magnesia-alumina spinel produced by a process comprising:

providing a powder comprising magnesia-alumina spinel;

producing a closed porosity body from said powder; and heating said closed porosity body to at least about 1400° C. at elevated pressure of at least about 20,000 psi to reduce residual porosity;

said diffraction grating having a transmittance per 1.88 millimeter thickness in all wavelengths from about 0.3 to about 0.8 microns of not less than about 85 percent.

* * * * *

UNITED STATES PATENT AND TRADEMARK OFFICE
CERTIFICATE OF CORRECTION

PATENT NO. : 4,983,555
DATED : January 8, 1991
INVENTOR(S) : Donald W. Roy and James L. Hastert It is certified that error appears in the above-identified patent and that said Letters Patent is hereby corrected as shown below:

Title page:
Section [54], the Title, delete "APPLICATION" and insert therefor --APPLICATIONS--.

Column 1, in the title, delete "APPLICATION" and insert therefor --APPLICATIONS--.

Column 2, line 3, delete "material" and insert therefor --materials--.

Column 4, line 9, after "methods" insert --.--.

Column 7, line 37, after "operation" insert --.--.

Column 8, line 25, delete "460" and insert therefor --1460--.

Column 9, line 15, delete "800" and insert therefor --1800--.

UNITED STATES PATENT AND TRADEMARK OFFICE
CERTIFICATE OF CORRECTION

PATENT NO. : 4,983,555
DATED : January 8, 1991
INVENTOR(S) : Donald W. Roy, et al.

It is certified that error appears in the above-identified patent and that said Letters Patent is hereby corrected as shown below:

Column 10, line 16, after "porosity" insert --.--.

Column 11, line 55, delete "7" and insert therefor --4--.

Column 12, line 63, Table 6, in the column entitled "Run No.", insert --1--.

Signed and Sealed this

Twelfth Day of May, 1992

Attest:

DOUGLAS B. COMER

*Attesting Officer*    Acting Commissioner of Patents and Trademarks